United States Patent
Joe et al.

(10) Patent No.: US 9,967,852 B2
(45) Date of Patent: May 8, 2018

(54) CPE NETWORK CONFIGURATION SYSTEMS AND METHODS

(71) Applicant: Verizon Patent and Licensing Inc., Arlington, VA (US)

(72) Inventors: Brian W. Joe, Irvine, CA (US); Ashay Chaudhary, Redmond, WA (US); Sandeep Sharma, Fremont, CA (US); Ray A. Sears, Capitola, CA (US); Yaojun Zeng, San Jose, CA (US)

(73) Assignee: VERIZON DIGITAL MEDIA SERVICES INC., Dulles, VA (US)

( * ) Notice: Subject to any disclaimer, the term of this patent is extended or adjusted under 35 U.S.C. 154(b) by 178 days.

(21) Appl. No.: 14/665,914

(22) Filed: Mar. 23, 2015

(65) Prior Publication Data

US 2016/0285703 A1  Sep. 29, 2016

(51) Int. Cl.
*H04W 60/04* (2009.01)
*H04L 12/24* (2006.01)

(52) U.S. Cl.
CPC ........... *H04W 60/04* (2013.01); *H04L 41/082* (2013.01); *H04L 41/5051* (2013.01); *H04L 41/5054* (2013.01); *H04L 41/0886* (2013.01)

(58) Field of Classification Search
CPC ............. H04L 41/5051; H04L 41/5054; H04L 41/082; H04W 60/04
See application file for complete search history.

(56) References Cited

U.S. PATENT DOCUMENTS

| 2003/0035399 | A1* | 2/2003 | Ishibashi | H04W 28/18 370/338 |
| 2007/0008900 | A1* | 1/2007 | Shousterman | H04W 88/182 370/252 |
| 2012/0020284 | A1* | 1/2012 | Haddad | H04L 29/06 370/328 |
| 2012/0178414 | A1* | 7/2012 | Fiatal | H04M 3/4872 455/406 |
| 2013/0305344 | A1* | 11/2013 | Alicherry | H04L 63/0272 726/12 |
| 2014/0172947 | A1* | 6/2014 | Ghai | H04L 65/102 709/202 |

* cited by examiner

*Primary Examiner* — Michael Thier
*Assistant Examiner* — Brian P Cox
(74) *Attorney, Agent, or Firm* — Los Angeles Patent Group; Arman Katiraei

(57) ABSTRACT

Techniques described herein may be used to create and manage a network of customer premise equipment (CPE) devices (e.g., a CPE network). CPE devices may be rapidly initialized by integrating a process for initializing the CPE devices with a wireless network with a process for initializing the CPE devices with the CPE network. Configuration information for controlling the CPE devices may be managed and stored in a centralized location as machine-readable, computer-programming objects, which may be combined to provide a comprehensive view of the CPE network. Network services may be efficiently introduced into the CPE network and managed by creating virtual CPE devices that are associated with the CPE devices of the CPE network.

17 Claims, 11 Drawing Sheets

CPE NETWORK CONFIGURATION SYSTEMS AND METHODS

BACKGROUND

Businesses and other types of organizations often include multiple branches, stores, offices, and/or other types of locations. Computer networks in such organizations may need to be installed so that information may be securely and efficiently communicated between the locations. Setting up such a network often includes deploying one or more network devices (referred to as customer premise equipment (CPE) devices) at the various physical locations associated with the organization. The CPE devices may collectively act to form a network, such as a private network for the organization, that spans the various physical locations.

Examples of CPE devices may include a router, a switch, a modem, a virtual private network (VPN) endpoint, a firewall device, a network address translation (NAT) device, a content delivery network (CDN) device, and more. The CPE devices may be managed by a third party, such as a network operator or other third party that is hired by the organization associated with the various physical locations

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide techniques for creating and managing a network of CPE devices (e.g., also referred to as a CPE network). For instance, initializing a CPE device may be simplified by registering the CPE device with a wireless network and a CPE network simultaneously. Once the CPE device is registered with the CPE network, CPE configuration data that controls how the CPE device operates within the CPE network may be automatically pushed to the CPE device from the CPE network.

Additionally, or alternatively, instead of having different, vendor-specific configuration files for the CPE devices within the CPE network, CPE configuration data may be standardized in an easily parsed and machine-readable language, such as Extensible Markup Language (XML), JavaScript Object Notation (JSON), etc., and stored in a CPE network device (e.g., a CPE configuration device) that may be part of a distributed database. Standardizing CPE configuration data in such a manner may make the CPE configuration data accessible by any authorized user or program (e.g., rather than distinct, vendor-specific programs), may alleviate data loss concerns and complexities involving synchronization and recovery, and/or may enable the CPE configuration data to be combined to create a comprehensive picture of the CPE network. Further, additional network services may be provided to the CPE network by creating virtual CPE devices (e.g., a virtual firewall device, a virtual NAT device, etc.) that are connected to the CPE devices of the network, thereby reducing the time and resource required to deploy, manage, and maintain multiple CPE devices at each customer location.

Figure 1:
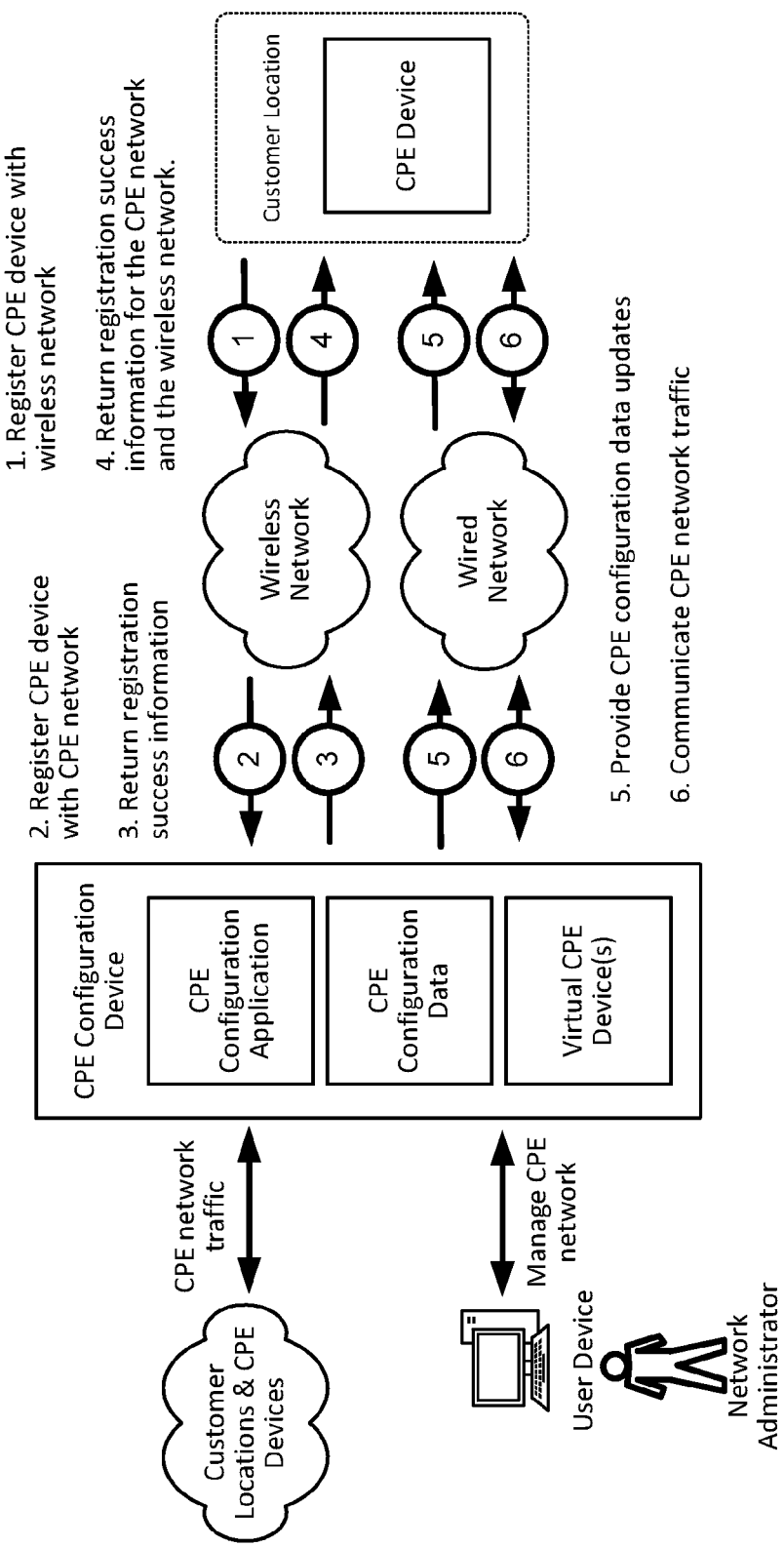
FIG. 1 illustrates an example overview of an implementation described herein.

FIG. 1 illustrates an example overview of an implementation described herein. As shown in FIG. 1, a CPE device at a customer location may communicate with a wireless network (e.g., a cellular network) to register with the wireless network (at 1). The wireless network may communicate with a CPE configuration device to register the CPE device with a CPE network (at 2). The CPE device may be registered by the CPE configuration device using the same information and/or database of information used to register the CPE device with the wireless network. The CPE configuration device may return a confirmation and/or other types of information relating to the successful registration of the CPE device with the CPE network to the wireless network (at 3), and the wireless network may communicate the information to the CPE configuration device, along with information relating to the successful registration of the CPE device with the wireless network (at 4). In some implementations, CPE configuration data that controls how the CPE device operates within the CPE network may be automatically pushed to the registered CPE device via the wireless network and/or the wired network (at 5).

The CPE configuration data may be created and/or managed by a network administrator via a user device and a CPE configuration application installed on the CPE configuration device. As mentioned above, the CPE configuration data for all the CPE devices in the CPE network may be standardized in an easily parsed and machine-readable language, such XML, JSON, etc., and may be arranged so as to provide a comprehensive and descriptive view of the CPE network to the network administrator. If and/or when the CPE configuration data is updated or otherwise changed (e.g., by the network administrator), the CPE configuration device may communicate with the CPE devices within the CPE network in order to control how each of the CPE devices behaves and operates (at 6).

Additionally, or alternatively, virtual CPE devices may be created by the CPE configuration device or another type of server device. Examples of virtual CPE devices may include a virtual firewall device, a virtual NAT device, a virtual CDN device, and more. The virtual CPE devices may be logically associated with one or more customer locations and/or CPE devices within the CPE network, such that CPE network traffic to and from the CPE devices is routed through the virtual CPE devices. As such, network services may be added to the CPE network without having to deploy and configure additional CPE devices at customer locations throughout the CPE network.

Figure 2:
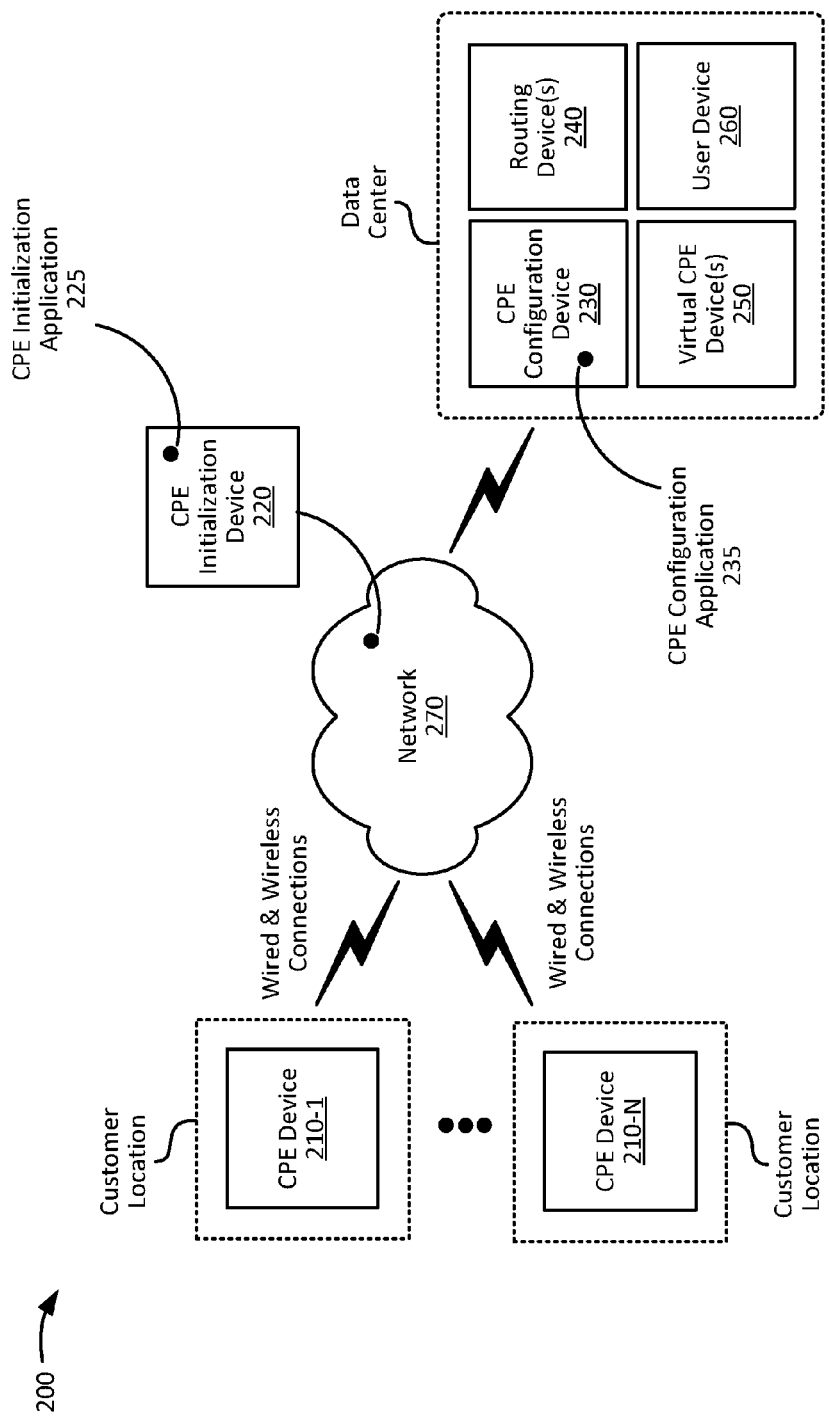
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include CPE devices 210-1 through 210-N (where N is an integer greater than or equal to 1), a CPE initialization device 220, a CPE configuration device 230, a routing device 240, a virtual CPE device 250, a user device 260, and a network 270.

CPE device 210 may include a network device that provides services relating to the network infrastructure of an entity. For example, the CPE device may provide services relating to network connectivity, security, data storage or caching, etc. Examples of common CPE devices include routers, firewall devices, NAT devices, CDN devices, virtual private network (VPN) devices, etc. CPE devices for a particular entity may be distributed at a number of different physical locations (e.g., offices). For example, CPE devices at different physical locations may implement VPN connections with the different physical locations to form a secure private network over unsecure communication links (e.g., over the Internet or over another network).

As shown in FIG. 2, CPE device 210 may be located at a customer location, which may include a store, an office, or another type of geographical location. Additionally, or alternatively, CPE device 210 may be connected to one or more other local devices. For instance, the customer location may include one or more personal computing or communication devices (e.g., a desktop computer, a laptop computer, a tablet computer, a smartphone, a telephone, etc.) that are connected to CPE device 210. In some implementations, CPE device 210 may be part of a private network involving multiple CPE devices 210 located at different customer locations.

CPE initialization device 220 may include one or more computing devices, such as a server device or a collection of server devices that act to register CPE device 210 with a wireless network and (with the assistance of CPE configuration device 230) with a CDN network. For instance, CPE initialization device 220 may include a home location register (HLR) device of a global system for mobile communication (GSM) network, a home subscriber server (HSS) of a long-term evolution (LTE) network, and/or one or more other types of network devices. Additionally, or alternatively, CPE initialization device 220 may include a CPE initialization application 225 that may enable CPE initialization device 220 to perform one or more of the initialization operations described herein. For example, CPE device 210 may register with CPE initialization device 220 (e.g., HLR device) when it first access the wireless network, and CPE initialization device 220 may automatically register CPE device 210 with a CPE network (e.g., CPE configuration device 230). In such implementations, CPE initialization device 220 may eliminate the step of CPE device 210 having to register with CPE configuration device 230 separately.

CPE configuration device 230 may include one or more computing devices, such as a server device or a collection of server devices that act to register CPE device 210 with the CPE network, configure CPE device 210, and/or create virtual CPE devices 250. As depicted in FIG. 2, CPE configuration device 230 may include a CPE configuration application that may enable CPE configuration device 230 to perform one or more of the operations described herein. For instance, CPE configuration device 230 may include CPE configuration data that controls how CPE devices 210 behave and operate within a CPE network, and CPE configuration application 235 may provide a network administrator with the ability to access, edit, and delete CPE configuration data. Additionally, or alternatively, CPE configuration application 235 may enable a network administrator to configure routing device 240, create and configure virtual CPE devices 250, and more.

Routing device 240 may include one or more networking devices, such as a switch, a router, and/or one or more other type of networking device. Routing device 240 may operate as a backbone to the CPE network connecting CPE devices 210. In some implementations, routing device 240 may include a distinct physical device. However, in other implementations, routing device 240 may include a virtual device within a server device (e.g., CPE configuration device 230) or another type of device within data center.

Virtual CPE device(s) 250 may each represent functionality associated with a "standard" CPE device that may conventionally be installed at the customer locations. For example, a virtual CPE device 250 may be a virtual firewall device, a virtual NAT device, a CDN device, and/or one or more other types of virtualized CPE devices. Each virtual CPE device 250 may be implemented in software (e.g., on a general purpose computer), in specialized hardware (e.g., on a physical version of the CPE device), or both. The data center may include the ability to dynamically add or remove virtual CPE devise 250 as needed based on customer demand.

Each virtual CPE device 250 may be associated with a particular customer location. For instance, if a customer location requires a firewall device, a virtual firewall device may be created at the data center. Traffic that would normally be processed locally by a hardware firewall (i.e., a CPE device implementing a firewall at the customer location) may instead be routed to the virtual firewall installed at the data center. For example, a CPE device 210 at the customer location, such as one implementing a VPN or router function, may be configured (via CPE configuration device 230) to incorporate the virtual firewall into the network topography of the customer location. In this manner, the customer location may receive firewall network services without a physical firewall device (e.g., without a physical CPE) having to be installed, configured, and maintained at the customer location.

User device 260 may include one or more types of computing devices. For example, user device 260 may include a desktop computer, a laptop computer, a tablet computer, a smartphone, and/or one or more other types of computing devices. User device 260 may be capable of communicating with one or more other devices within the data center. For instance, user device 260 may communicate with CPE configuration device 230 to manage and/or edit CPE configuration data for CPE devices 210. Additionally, or alternatively, user device 260 may manage and configure a CPE network by communicating with routing device 240. User device 260 may also, or alternatively, create and manage virtual CPE devices 250. While user depicted in FIG. 2 as being part of a data center, in some implementations, user device 260 may be located outside of the data center. For instance, user device 260 may be located at a customer location and may enable a customer to perform one or more of the user device operations described herein.

Network 270 may include one or more wired and/or wireless networks. For example, network 270 may include a cellular network (e.g., a second generation (2G) network, a third generation (3G) network, a fourth generation (4G) network, a fifth generation (5G) network, a LTE network, a GSM network, a code division multiple access (CDMA) network, an evolution-data optimized (EVDO) network, or the like), a public land mobile network (PLMN), and/or another network. Additionally, or alternatively, network 270 may include a local area network (LAN), a wireless LAN (WLAN), a wide area network (WAN), a metropolitan network (MAN), the Public Switched Telephone Network (PSTN), an ad hoc network, a managed IP network, a virtual private network (VPN), an intranet, the Internet, a fiber optic-based network, and/or a combination of these or other types of networks.

The quantity of devices and/or networks in environment 200 is not limited to what is shown in FIG. 2. In practice, environment 200 may include additional devices and/or networks, fewer devices and/or networks, different devices and/or networks, or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
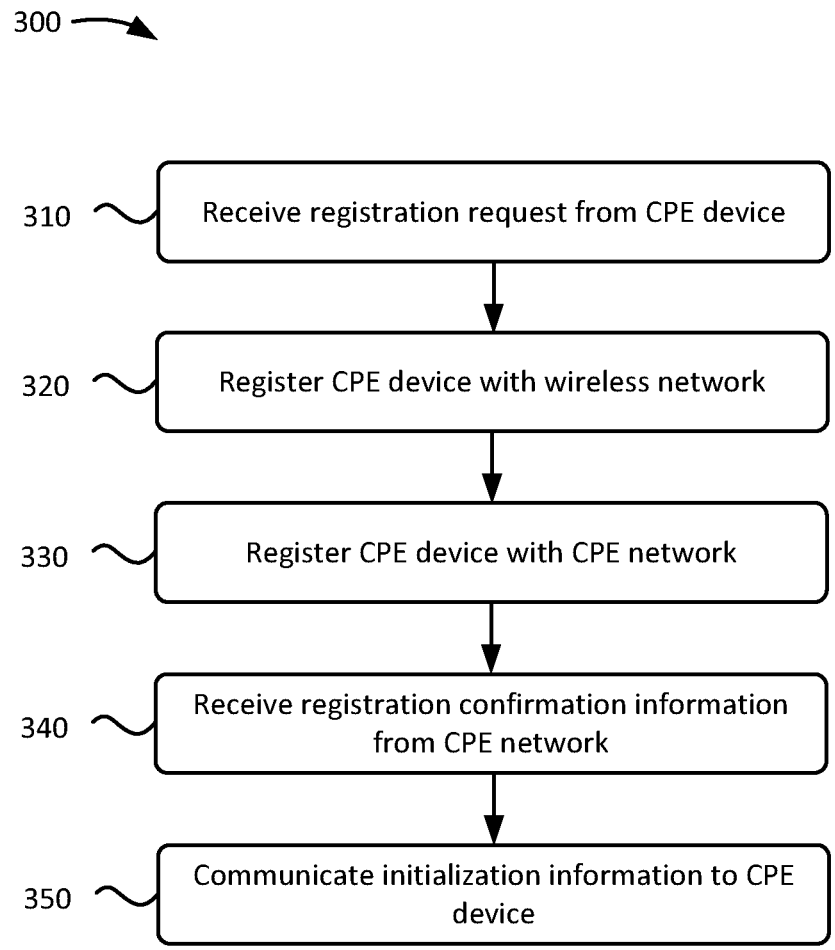
FIG. 3 illustrates a flowchart of an example process for initializing a CPE device from the perspective of a CPE initialization device.

FIG. 3 illustrates a flowchart of an example process 300 for initializing CPE device 210. In some implementations, process 300 may be performed by CPE initialization device 220 (e.g., by CPE initialization application 225). In some implementations, some or all of the blocks of process 300 may be performed by one or more other devices.

As shown in FIG. 3, process 300 may include receiving a registration request from CPE device 210 (block 310). For example, CPE initialization device 220 may receive a request from CPE device 210 to register with a network (e.g., a wireless network) to which CPE device 210 connects. In some implementations, CPE initialization device 220 may receive the request in response to a technician plugging CPE device 210 into an electrical outlet or otherwise providing power to CPE device 210. For instance, in one implementation, CPE initialization device 220 may be an HLR device associated with a wireless cellular network. A technician may plug CPE device 210 into an electrical outlet, causing CPE device 210 to power-on and attempt to attach to the wireless cellular network. As part of the initial attachment of CPE device 210 to the wireless network, CPE device 210 may register with the HLR device (i.e., with CPE initialization device 230).

Process 300 may include registering CPE device 210 with a wireless network (block 320). Examples of operations for registering CPE device 210 with a wireless network may include authentication and/or authorization of CPE device 210 with respect to the wireless network. In some implementations, registering CPE device 210 may include causing a logical connection, permissions, parameters, and/or one or more other types of network data to be logically associated with CPE device 210.

Process 300 may include registering CPE device 210 with a CPE network (block 330). For example, CPE initialization device 220 may register CPE device 210 with one or more CPE configuration devices 230 associated with a CPE network. In some implementations, CPE initialization device 220 may do so by communicating an identifier (e.g., a media access control (MAC) address) and/or one or more other types of authentication information to CPE configuration device 230, and CPE configuration device 230 may respond by registering CPE device 210 based on the information from CPE initialization device 220. In some implementations, CPE device 210 may be registered with a CPE network based on the same information used to register CPE device 210 with the wireless network and/or information that becomes available as a result of registering CPE device 210 with the wireless network.

Process 300 may include receiving registration confirmation from the CPE network (block 340). For example, CPE initialization device 220 may receive registration confirmation information from the CPE network in response to CPE device 210 being registered with the CPE network. In some implementations, the registration confirmation information may include one or more types of information, such as information reporting that CPE device 210 was successfully registered with CPE configuration device 230. Additionally, or alternatively, the registration confirmation information may include CPE configuration data, such as (e.g., routing information and addresses, encryption information, etc.) for communicating with other CPE devices 210 and/or one or more virtual CPE devices 250 within the CPE network.

Process 300 may include communicating initialization information to CPE device 210 (block 350). For instance, CPE initialization device 220 may communicate initialization information to CPE device 210. The initialization information may include the registration confirmation information from the CPE network and/or registration confirmation information from the wireless network. Similar to the registration confirmation from the CPE network (discussed above), examples of registration confirmation information from the wireless network may include information reporting that CPE device 210 was successfully registered with the wireless network and/or information for communicating via the wireless network. In some implementations, the initialization information may be communicated to CPE device 210 in a manner that is consistent with a portion of a networking standard (e.g., LTE). For instance, the registration confirmation information from the CPE network may be included in a customized field of a standard for communicating activation data to mobile devices.

While FIG. 3 shows a flowchart diagram of an example process 300 for initializing CPE device 210 from the perspective of CPE initialization device 220, in other implementations, a process for initializing CPE device 210 from the perspective of CPE initialization device 220 may include fewer operations, different operations, differently arranged operations, and/or additional operations than depicted in FIG. 3.

Figure 4A:
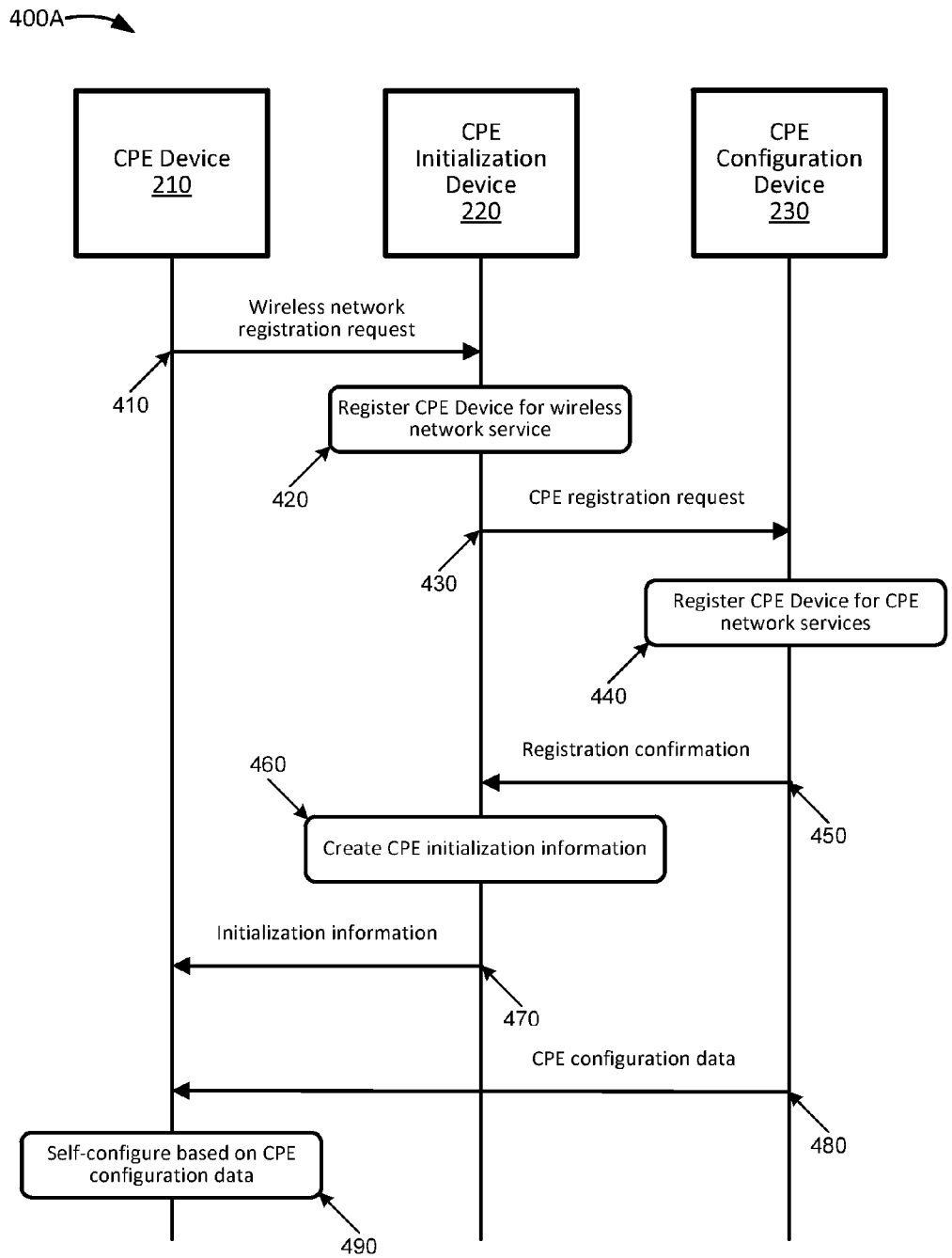
FIG. 4A illustrates a sequence flow diagram of an example process for initializing a CPE device.

FIG. 4A illustrates a sequence flow diagram of an example process 400A for initializing CPE device 210. As shown, CPE device 210 may communicate a request to register with a wireless network (line 410). The request may be received by a base station (not shown) of the wireless network and relayed to CPE initialization device 220 (block 420), which may include an HLR device, an HSS device, or another type of device within a wireless network. CPE initialization device 220 may register CPE device 210 with the wireless network (block 430), which may include performing one or more authentication and/or authorization processes.

CPE initialization device 220 may communicate a registration request to CPE configuration device 230 (line 430), and CPE configuration device 230 may register CPE device 210 for CPE network services (block 440). CPE configuration device 230 may confirm the registration of CPE 210 to CPE initialization device 220 (line 450), and CPE initialization device 220 may create CPE initialization information (block 460) (e.g., by combining the registration confirmation information from CPE configuration device 230 with information resulting from registering of CPE device 210 with the wireless network). CPE initialization device 220 may communicate the CPE initialization information to CPE device 210 (line 470). Additionally, or alternatively, CPE configuration device 230 may communicate CPE configuration data to CPE device 210 (line 480), which may cause CPE device 210 to self-configure based on the CPE configuration data (block 490).

In some implementations, prior to sending CPE configuration data to CPE device 210, CPE configuration device 230 may confirm that CPE device 210 is not already configured in accordance with the CPE configuration data. For instance, if CPE device 210 was recently configured in accordance with CPE configuration data, but has just been restarted (e.g., powered off and then powered back on), CPE configuration device 230 may verify whether CPE device 210 actually needs the CPE configuration data prior to communicating the CPE configuration data to CPE device 210. As such, CPE configuration device 230 may prevent CPE configuration data from being sent to CPE device 210 unnecessarily, which in turn may prevent CPE device 210 from automatically self-reconfiguring unnecessarily.

While FIG. 4A shows a sequence flow diagram of an example process 400A for initializing CPE device 210, in other implementations, a process for initializing CPE device 210 may include fewer operations, different operations, differently arranged operations, and/or additional operations than depicted in FIG. 4A.

Figure 4B:
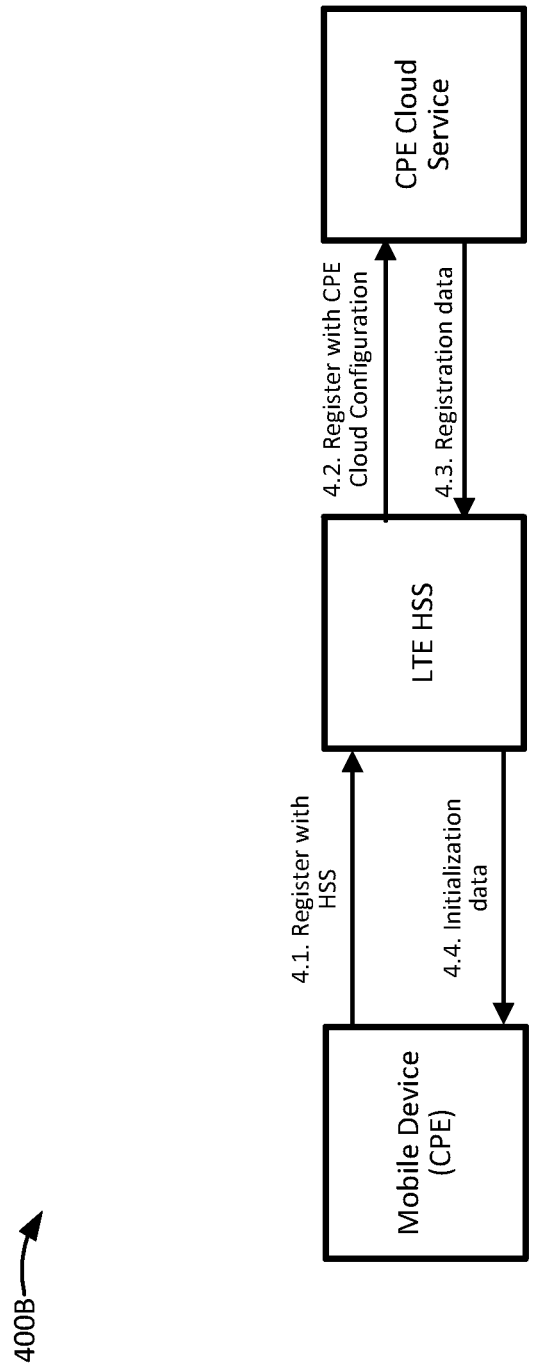
FIG. 4B illustrates a sequence flow diagram of a particular example process for initializing a CPE device.

FIG. 4B illustrates a sequence flow diagram of a particular example process 400B for initializing CPE device 210. As shown, a mobile device (e.g., CPE device 210) may register with an HSS (e.g., CPE initialization device 220) of an LTE network (at 4.1). In turn, the LTE HSS may register the mobile device with a CPE cloud service (e.g., CPE configuration device 230) (at 4.2), and the CPE cloud service may return registration data to the LTE HSS (at 4.3). The LTE HSS may then communicate initialization data to the mobile device (at 4.4).

Figure 5:
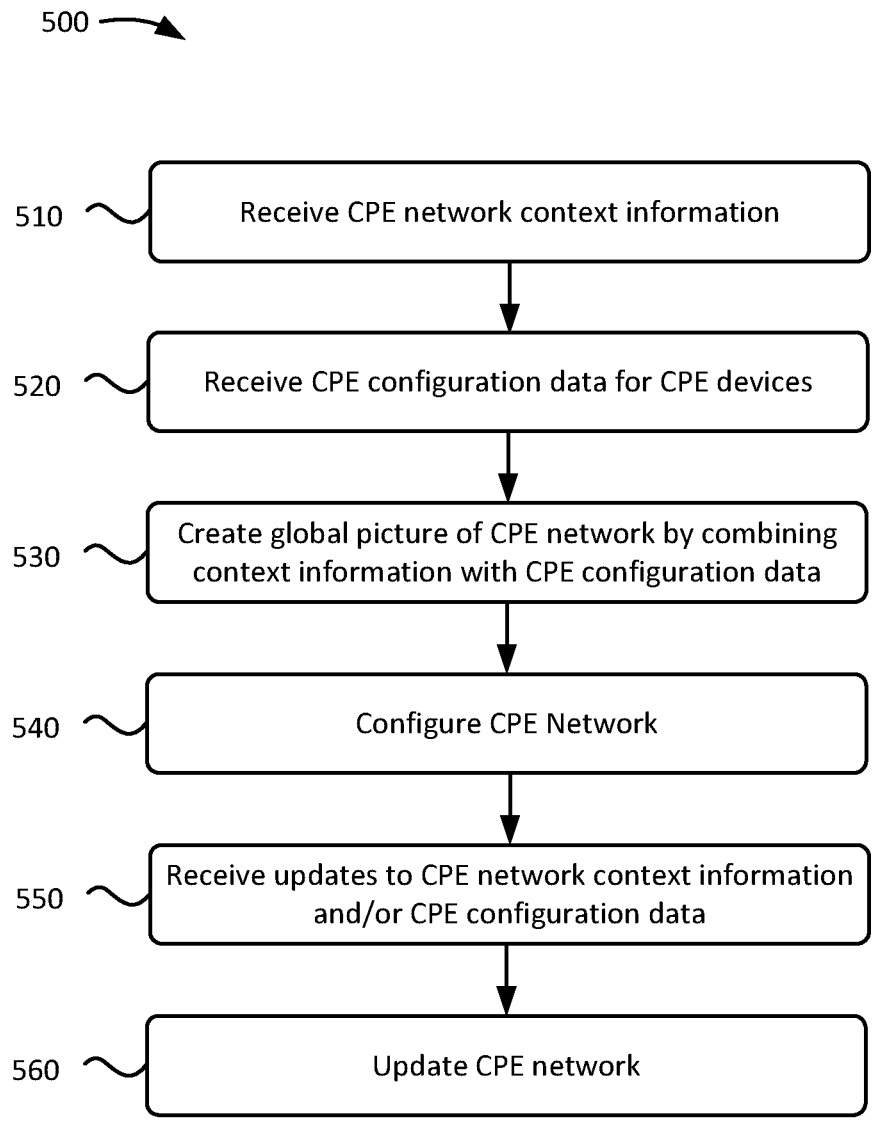
FIG. 5 illustrates a flowchart of an example process for configuring a CPE network.

FIG. 5 illustrates a flowchart of an example process 500 for configuring a CPE network. In some implementations, process 500 may be performed by CPE configuration device 230 (e.g., by CPE configuration application 235). In some implementations, some or all of the blocks of process 500 may be performed by one or more other devices.

Process 500 may include receiving CPE network context information (block 510). For example, CPE configuration device 220 may receive CPE network context information from user device 260. The CPE network context information may include information describing a CPE network, information describing CPE devices, information describing customer locations, information describing the manner in which CPE devices are arranged within the CPE network, and/or one or more other types of contextual information. The CPE context information may be arranged into discrete objects corresponding to one or more aspects of the CPE network, such as a description of a single CPE device, multiple CPE devices, a quantity of CPE devices 210 in the CPE network, a quantity of subnets in the CPE network, the geographical locations of the CPE devices 210, and/or one or more other types of information describing the CPE network. The CPE network context information may be formatted according to XML, JSOL, and/or one or more other types of easily parsed and machine-readable languages.

Process 500 may include receiving CPE configuration data for CPE devices (block 520). For instance, CPE configuration device 230 may receive CPE configuration data from user device 260. The CPE configuration data may include one or more types of configuration information, such as information for identifying CPE devices 210 (e.g., unique identifiers), information for routing data through a CPE network (e.g., IP addresses), cryptography information (e.g., encryption parameters), etc. The CPE configuration data may be arranged into discrete objects corresponding to one or more aspects of the CPE network, such as a single CPE device 210, multiple CPE devices 210, network subnets, etc. Similar to the CPE network context information, the CPE configuration data may be formatted according to XML, JSOL, and/or one or more other types of easily parsed and machine-readable languages.

Process 500 may include creating a global picture of a CPE network by combining context information with CPE configuration data (block 530). For example, CPE configuration device 230 may create a global picture of a CPE network by combining CPE network context information with CPE configuration data (e.g., by combining context information objects with configuration data objects). For example, CPE configuration device 230 may include a statement of the quantity of CPE devices 210 in a CPE network and a description of the network configuration (e.g., whether the CPE devices 210 are on the same of different subnets), along with a list of the actual IP addresses of CPE devices 210. In such an example, an administrator of the CPE network may readily understand the quantity of all CPE devices 210 in the CPE network, the arrangement of all CPE devices 210 in the network, and/or the actual IP addresses of all CPE devices 210 within the network, regardless of whether the administrator created the CPE network or was recently introduced to the CPE network. The global picture of the CPE network may be created via CPE configuration application 235.

Process 500 may include configuring a CPE network (block 540). For example, CPE configuration device 230 may configure the CPE network based on CPE configuration data. In some implementations, CPE configuration device 230 may configure the CPE network by communicating CPE configuration information to CPE devices 210 within the CPE network.

Process 500 may include receiving updates to CPE network context information and/or CPE configuration data (block 550). For example, CPE configuration device 230 may receive updates to CPE network context information and/or CPE configuration data from user device 260. In some implementations, the update may corresponding to adding and/or removing one or more CPE devices 210 from the CPE network. Additionally, or alternatively, the update may include changing the manner in which an existing CPE device 210 operates within the CPE network. In certain implementations, the update may include adding and/or removing descriptive information regarding how the CPE network is configured, how CPE devices within the CPE network are configured or allocated, etc. The update data may be received by CPE configuration device 230 via CPE configuration application 235.

Process 500 may include updating the CPE network (block 560). For example, CPE configuration device 230 may update a CPE network based on (or in response to) updates to CPE network context information and/or CPE configuration data. For instance, if a new CPE device has been added to the CPE network, CPE configuration device 230 may update the CPE network by communicating configuration data to the new CPE device 210 and/or by communicating updated CPE configuration data to other CPE devices 210 within the network. Additionally, or alternatively, if an existing CPE device has been removed from the CPE network or reconfigured, updating the CPE network may include communicating updated configuration information to the remaining CPE devices 210 in the CPE network.

While FIG. 5 shows a flowchart diagram of an example process 500 for configuring a CPE network, in other implementations, a process for configuring a CPE network may include fewer operations, different operations, differently arranged operations, and/or additional operations than depicted in FIG. 5.

Figure 6:
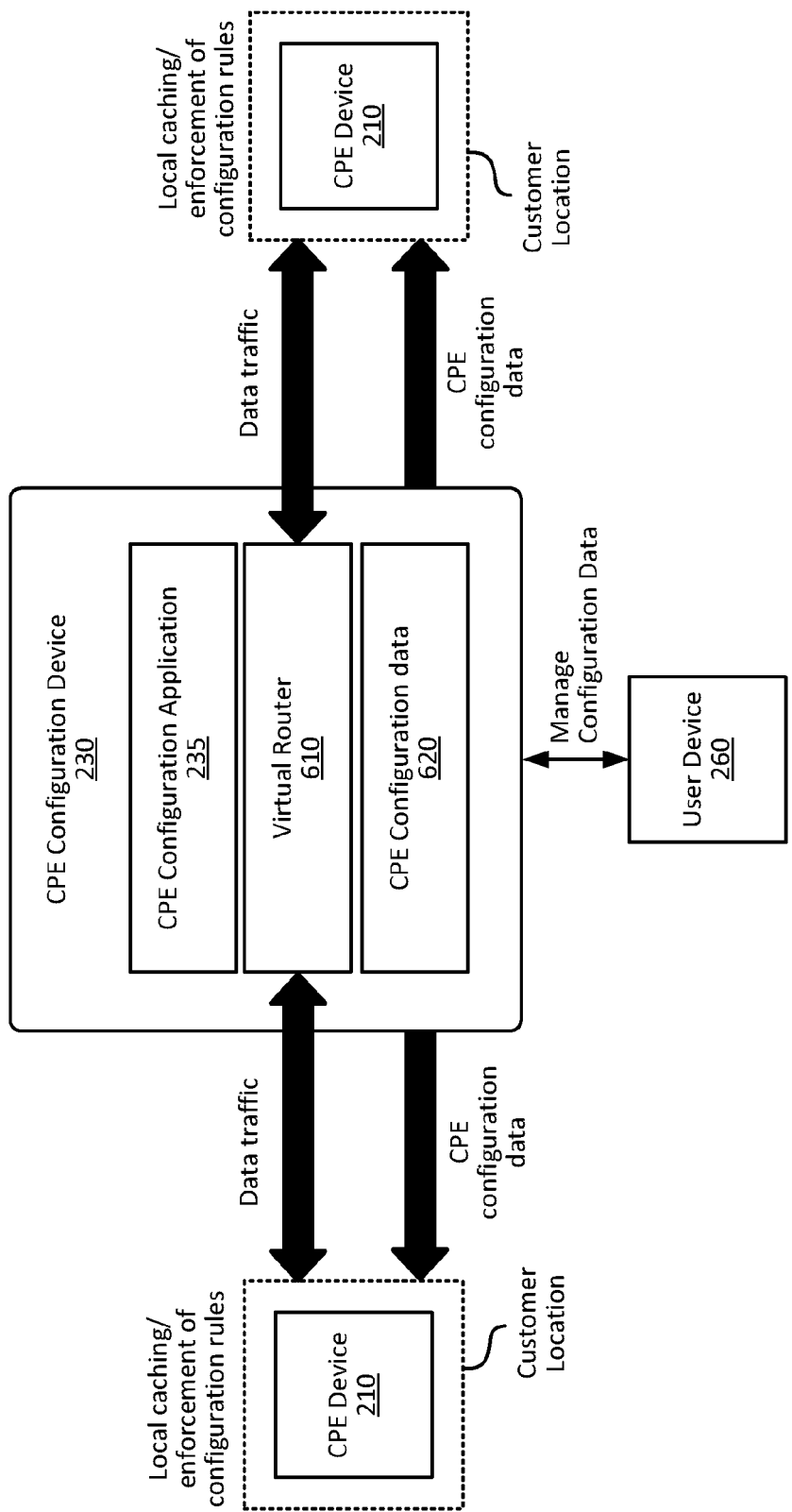
FIG. 6 illustrates a diagram of an example of a CPE configuration device.

FIG. 6 illustrates a diagram of an example of CPE configuration device 230. As shown, configuration device 230 may include CPE configuration application 235, virtual router 610, and CPE configuration data 620. Additionally, or alternatively, CPE configuration device 230 may be in communication with CPE devices 210 and/or user device 260.

CPE configuration device 230 may communicate CPE configuration data 620 to CPE devices 210. CPE devices 210 may use CPE configuration data 620 to establish a CPE network between CPE devices 210 via virtual router 610. CPE configuration data 620 may be communicated to CPE devices 210 upon initialization of CPE devices 210. Changes to CPE configuration data 620 may inputted by a user via user device 260 and CPE configuration application 235. If and/or when CPE configuration data 620 for the CPE network is updated, CPE configuration device 230 may communicate the updates to CPE device 210 in order to update the overall CPE network. Accordingly, control and maintenance of a CPE network can be handled by CPE configuration device 230 by limiting CPE devices 210 to locally caching and enforcing control plane rules rather than complex routing decisions.

Figure 7:
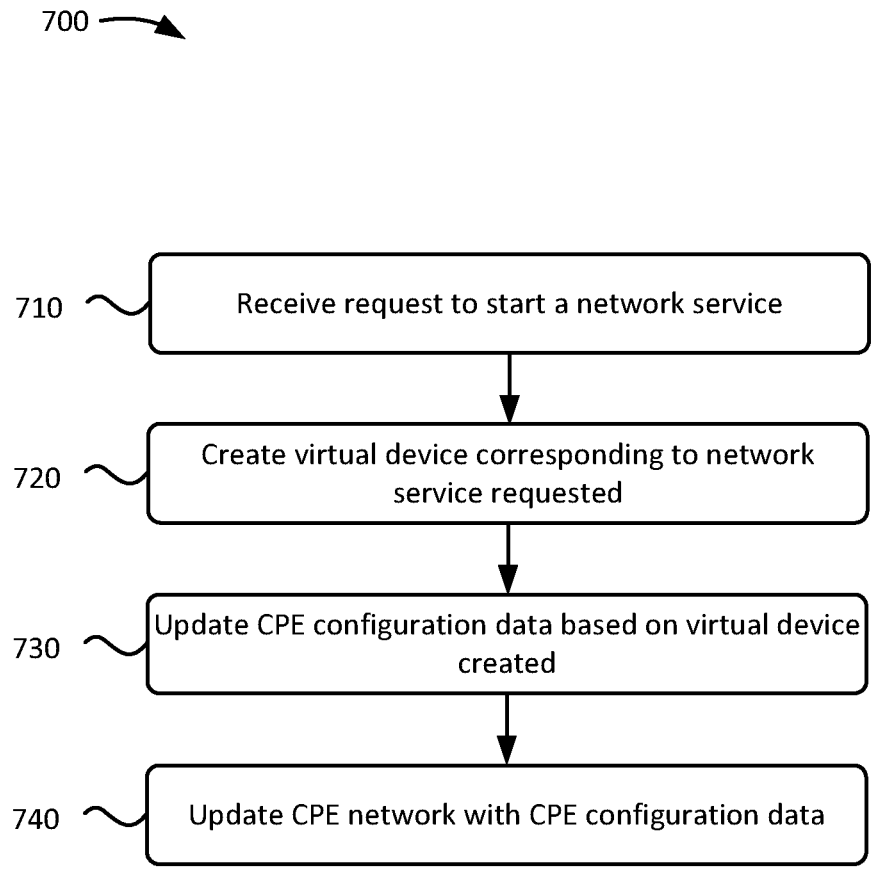
FIG. 7 illustrates a flowchart of an example process for providing virtual network services within a CPE network.

FIG. 7 illustrates a flowchart of an example process 700 for providing virtual network services within a CPE network. In some implementations, process 700 may be performed by CPE configuration device 230 (e.g., by CPE configuration application 235). In some implementations, some or all of the blocks of process 700 may be performed by one or more other devices.

As shown, process 700 may include receiving a request to start (or begin providing) a network service (that would normally be provided by a locally implemented CPE device (block 710). For example, CPE configuration device 230 may receive a request for a particular network service from user device 260. In some implementations, the network service may include a firewall service, a NAT service, a CDN service, and/or one or more other types of network services. Additionally, or alternatively, the network service may correspond to a particular CPE device 210 and/or a particular customer location. The request may be received in conjunction with, or at some point after, deploying CPE device 210 at a customer location.

Process 700 may include creating a virtual device corresponding to the network service requested (block 720). For instance, CPE configuration device 230 may create a virtual device capable of providing the type of network service requested by user device 260. Examples of such virtual devices may include a virtual firewall device, a virtual NAT device, a virtual CDN device, and/or one or more other types of virtual devices capable of providing a network service.

Process 700 may include updating CPE configuration data 620 based on the virtual device created (block 730). For instance, CPE configuration device 230 may update CPE configuration data 620 to reflect the deployment of the virtual device within the corresponding CPE network. The updated CPE configuration data 620 may be associated with a particular CPE device 210. For example, if the request for the network service pertains to a particular customer location, CPE configuration device 230 may update CPE configuration data 620 associated with the particular CPE device 210 deployed at the customer location. The type of CPE configuration data 620 updated by CPE configuration device 230 may instructions and/or parameters for routing network data from the CPE device 210 of a particular customer location to the newly created virtual device.

Process 700 may include updating a CPE network with the updated CPE configuration data 620 (block 740). For example, CPE configuration device 230 may update a CPE network by communicating updated CPE configuration data 620 to one or more CPE devices 210 within the CPE network. In some implementations, communicating the updated CPE configuration data 620 may cause CPE devices 210 receiving the updates to begin operating in accordance with the updated CPE configuration data 620. For instance, if the updated CPE configuration data 620 includes instructions and/or parameters for routing network data to a virtual firewall device, the CPE device 210 receiving the updated CPE configuration data 620 may begging routing network data to the virtual firewall device in response to receiving the updated CPE configuration data 620 from CPE configuration device 230.

While FIG. 7 shows a flowchart diagram of an example process 700 for providing virtual network services within a CPE network, in other implementations, a process for providing virtual network services within a CPE network may include fewer operations, different operations, differently arranged operations, and/or additional operations than depicted in FIG. 7.

Figure 8:
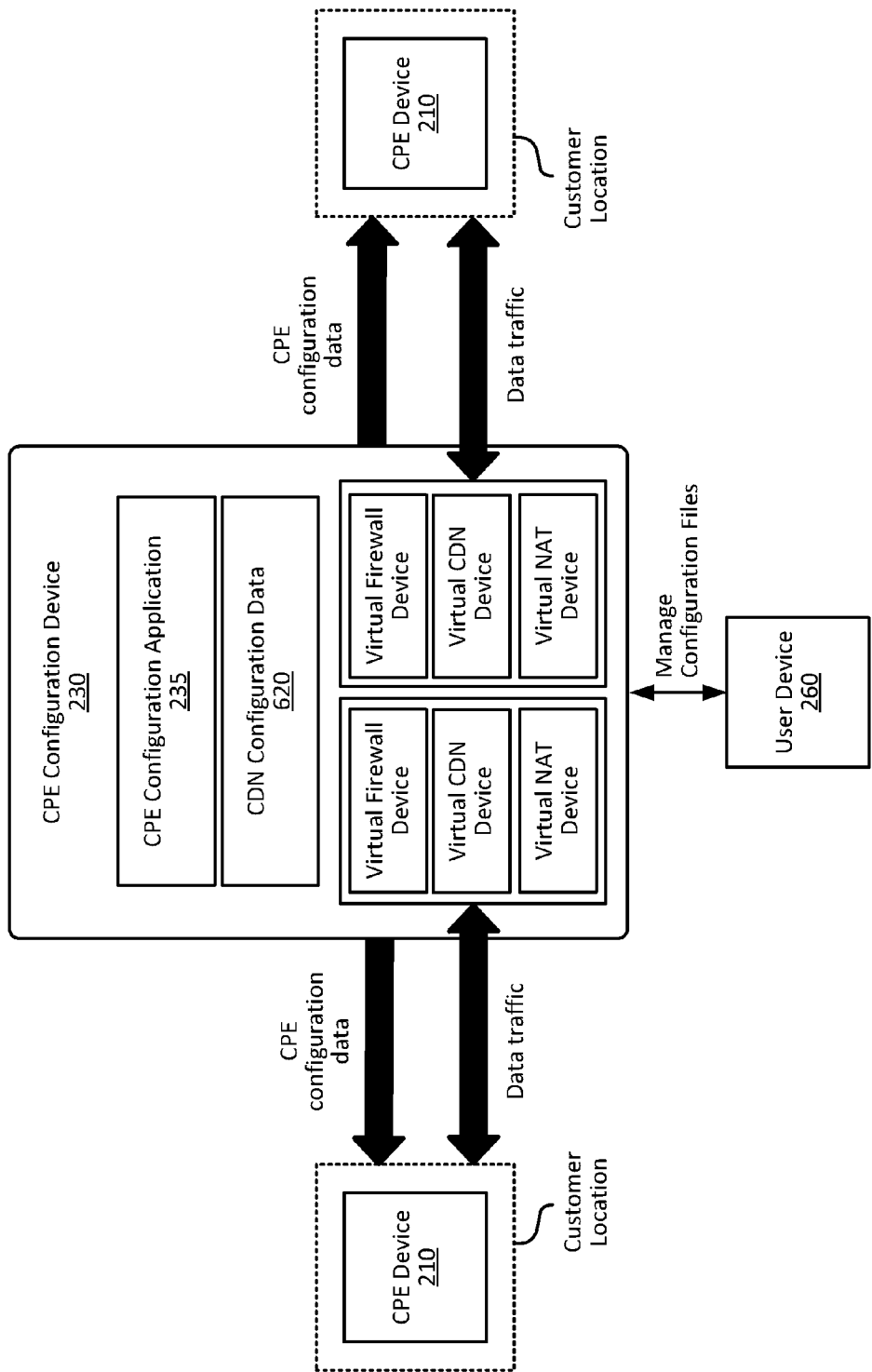
FIG. 8 illustrates a diagram of an example of a CPE configuration device.

FIG. 8 illustrates a diagram of an example CPE configuration device 230. As shown, configuration device 230 may include CPE configuration application 235, CPE configuration data 620, and multiple virtual device (e.g., virtual firewall devices, virtual CDN devices, and virtual NAT devices). Additionally, or alternatively, CPE configuration device 230 may be in communication with CPE devices 210 and/or user device 260.

CPE configuration device 230 may communicate CPE configuration data 620 to CPE devices 210. CPE devices 210 may use the CPE configuration data to establish a CPE network between CPE devices 210 via virtual devices allocated to each CPE device 210. Doing so may provide a solution for offering additional networking services to each customer location without having to deploy additional devices at each customer location.

In some implementations, the virtual devices may be created prior to initialization of CPE devices 210, such that the virtual devices will be available to CPE devices 210 upon initialization of CPE devices 210. Additionally or alternatively, virtual devices for the CPE devices 210 may be created at a later point in time. For instance, a customer of one or more customer locations may request that one or more network services be added to an existing customer account for network services. In response to the request, a network administrator may create one or more virtual devices for the customer locations and reconfigure CPE devices 210, via updating and distributing the CDN configuration data 620, to route network traffic to the virtual devices.

Figure 9:
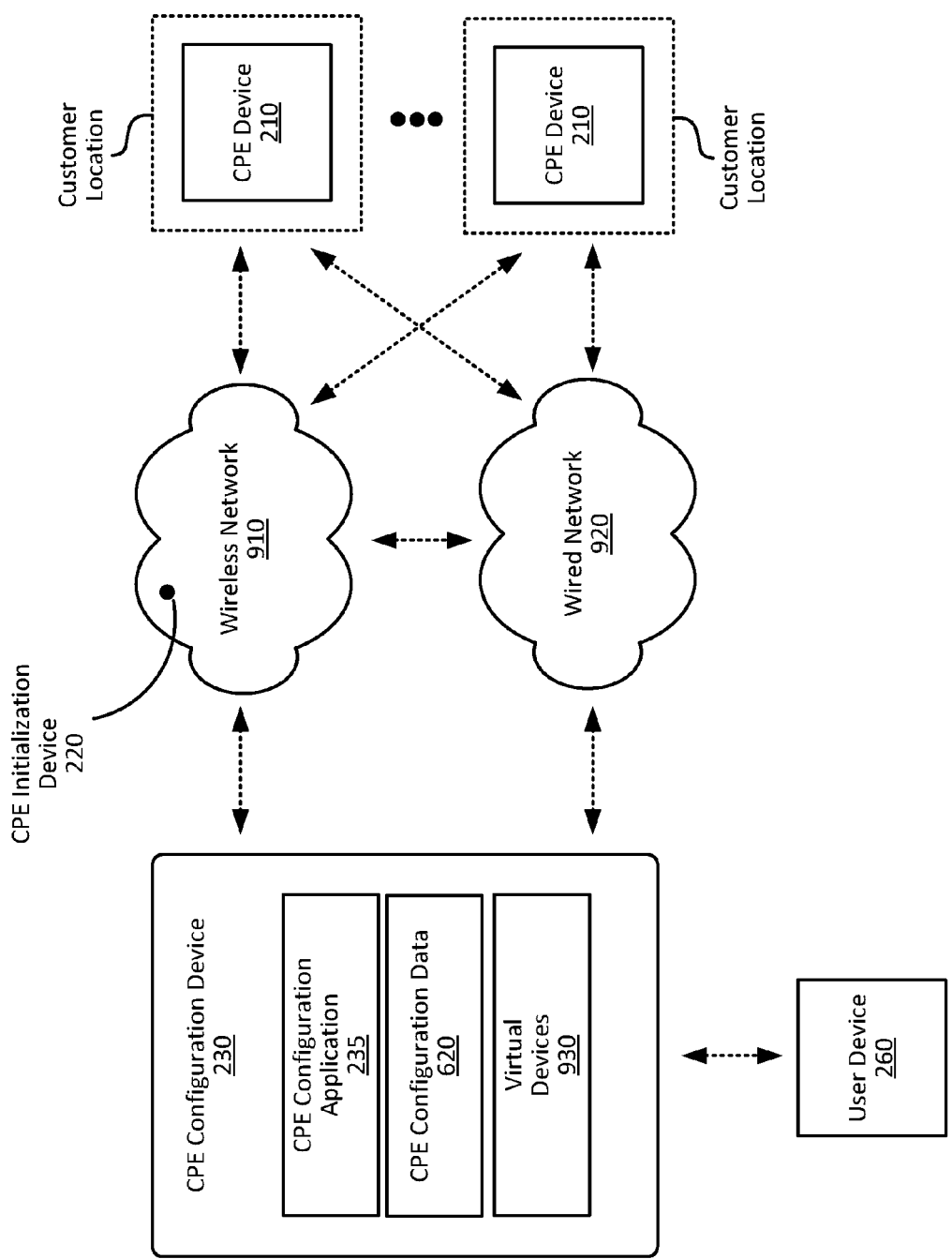
FIG. 9 illustrates a diagram of an example of a CPE network.

FIG. 9 illustrates a diagram of an example of a CPE network. CPE devices 210 may be deployed at one or more stores, offices, and/or other types of customer locations. CPE devices 210 may communicate with CPE initialization device 220 in order to register with wireless network 910. In response, CPE initialization device 220 may register CPE devices 210 with wireless network 910 and/or communicate with CPE configuration device 230 to register CPE devices 210 with the CPE network. CPE configuration device 230 may register CPE devices 210 with the CPE network and/or communicate registration confirmation information to CPE initialization device 220. CPE initialization device 220 may communicate the registration confirmation information to CPE devices 210, which may include initialization information for network services via wireless network 910.

CPE devices 210 may self-configure for the CPE network based on CPE configuration data 620 from CPE initialization device 220, which enable CPE devices 210 to being participating in the CPE network. Whether CPE devices 210 participating in the CPE network via wireless network 910 and/or wired network 920 may depend on one or more factors, such as CPE configuration data 620, the availability of wireless network 910 and/or wired network 920, an available bandwidth corresponding to wireless network 910 and/or wired network 920, and/or one or more other types of factors. For instance, CPE configuration data 620 may cause CPE devices 210 to participate in the CPE network via wireless network 910 until a connection with wired network 920 becomes available (e.g., is later installed at the customer location).

CPE configuration data 620 stored by CPE configuration device 230 may be created and/or updated by a network administrator via user device 260 and CPE configuration application 235. For example, CPE devices 210 may initially be configured to participate in the CPE network via wireless network 910; however, the needs of the CPE network may become such that a significant amount of additional bandwidth is required. In such circumstances, the network administrator may update CPE configuration data 620 and may communicate the updated CPE configuration data 620 to CPE devices 210. The updated CPE configuration data 620 may cause CPE devices 210 to being participating in the CPE network via wired network 920 instead of, or in addition to, wireless network 910.

Virtual network services may also be added to the CPE network. For instance, a security attack on the CPE network may give rise to a need for one or more types of network security services. In such a scenario, a network administrator may cause CPE configuration device 230 (e.g., via user device 260 and/or CPE configuration application 235) to create one or more virtual devices 930 (e.g., a virtual firewall device) to introduce network security services into the CPE network. Virtual devices 930 may be removed, updated, reconfigured, etc., via user devices 260 and/or CPE configuration application 235. Additionally, or alternatively, updated CPE configuration data 620 may be provided to CPE devices 210 in order to fully implement new and/or updated virtual network devices 930 into the CPE network.

Figure 10:
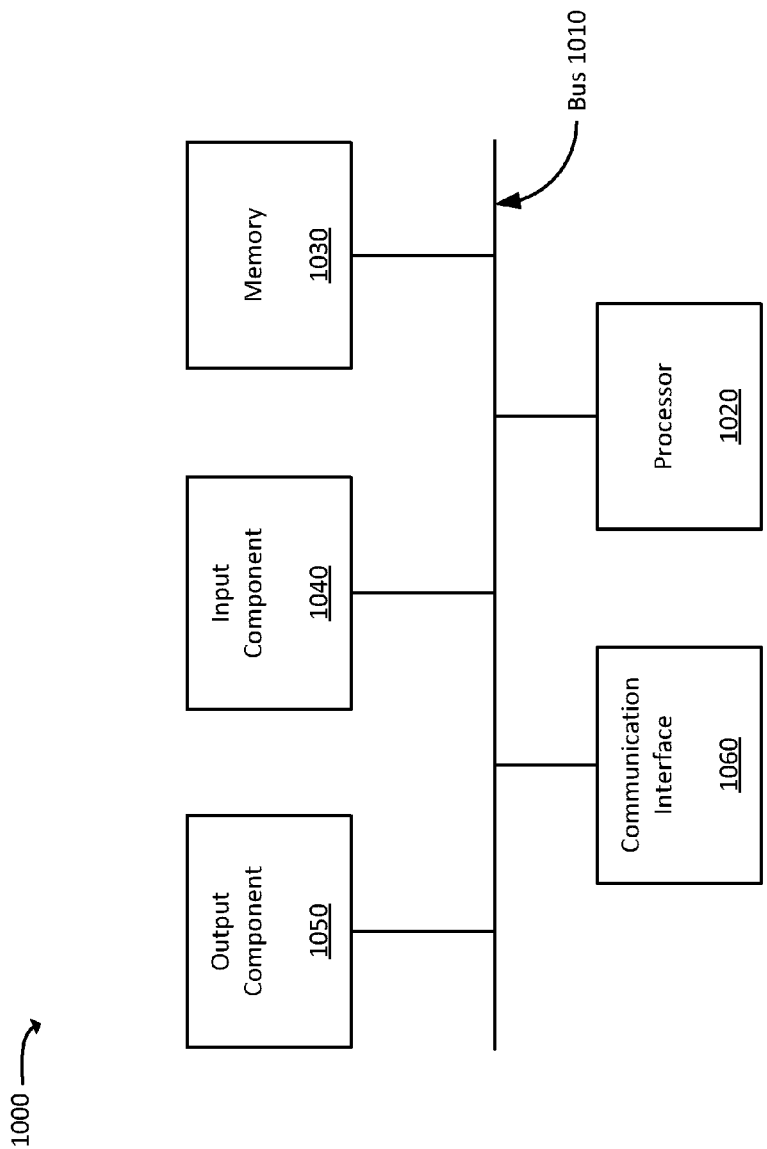
FIG. 10 illustrates example components of one or more devices, according to one or more implementations described herein.

FIG. 10 is a diagram of example components of device 1000. One or more of the devices described above (e.g., with respect to FIGS. 1, 2, 4, 6, 8 and 9) may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes (LEDs), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to one or more figures described herein, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIG. 2), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. The term "greater than" (or similar terms) as used herein to describe a relationship of a value to a threshold, may be used interchangeably with the term "greater than or equal to" (or similar terms). Similarly, the term "less than" (o similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method implemented by one or more computing devices of a data center, the method comprising:
   receiving, by the one or more computing devices at the data center, a request, from a network administrator, requesting addition of a network service to a particular customer location, wherein the data center is in a different remote location than the particular customer location with the particular customer location including at least one physical customer premise equipment (CPE) device implementing a private network with a plurality of other physical CPE devices located at a plurality of additional customer locations;
   creating on the one or more computing devices of the data center and in response to the request, a virtual CPE device providing the requested network service for the at least one physical CPE device in the particular customer location from the remote location of the data center;
   updating, by the one or more computing devices at the data center and based on the creation of the virtual CPE device, configuration information of the at least one physical CPE device and the plurality of other physical CPE devices, said updating comprising adding the virtual CPE device to the private network by providing routing and addressing of the virtual CPE device to the configuration information;
   automatically configuring, by the one or more computing devices and based on the updated configuration information, the at least one physical CPE device at the particular customer location, said automatically configuring comprising distributing said configuration information with said routing and said addressing of the virtual CPE device from the data center to the at least one physical CPE device at the particular customer location;
   modifying operation of the at least one physical CPE device in response to said distributing, wherein said modifying comprises routing network data from the at least one physical CPE device at the particular customer location to the virtual CPE device at the data center in the remote location and providing the network service on the network data with the virtual CPE device before rerouting the network data from the virtual CPE device to a CPE device of the plurality of other physical CPE devices specified as an original destination for said network data by the at least one physical CPE device.

2. The method of claim 1, further comprising:
   automatically configuring the plurality of other physical CPE devices, based on the updated configuration information, to be compatible with the virtual CPE device.

3. The method of claim 1, further comprising:
   receiving a registration request corresponding to a new CPE device, the registration request comprising information for registering the new CPE device with the private network;
   registering the new CPE device with the private network based on the information received; and
   initializing the new CPE device in response to registering the new CPE device with the private network.

4. The method of claim 3, wherein the registration and initialization of the new CPE device occurs via a wireless network and network traffic within the private network is routed through the one or more computing devices via a wired network.

5. The method of claim 3, further comprising:
   prior to registering the new CPE device with the private network, receiving a request to register the CPE device with a wireless network; and
   registering the new CPE device with the wireless network in response to receiving the request.

6. The method of claim 1, further comprising:
   receiving CPE network traffic from one of the plurality of other CPE devices; and
   routing the CPE network traffic to another of the plurality of CPE devices.

7. The method of claim 1, wherein the configuration information includes a plurality of machine-readable, computer-programming objects that comprise information describing the private network and information to control the behavior of the private network.

8. At least one computing device comprising processing circuitry to:
   receive a request, from a network administrator, requesting addition of network attack firewall protections for a particular customer location, the particular customer location including at least one physical customer premise equipment (CPE) device implementing a private network with a plurality of other physical CPE devices located at a plurality of additional customer locations;
   create, in response to the request, a virtual CPE device providing said network attack firewall protections for the particular customer location from a different remote location;
   update, based on the creation of the virtual CPE device, configuration information of the at least one physical CPE device and the plurality of other physical CPE devices, said updating comprising adding the virtual CPE device to the private network by providing routing and addressing of the virtual CPE device to the configuration information;
   automatically configure, based on the updated configuration information, the at least one physical CPE device at the particular customer location, said automatically configuring comprising distributing said configuration information with said routing and said addressing to the at least one physical CPE device;
   modify operation of the at least one physical CPE device in response to said configuring, wherein said modifying comprises routing network data exchanged between the at least one physical CPE device and any device CPE device of the plurality of other physical CPE devices to the virtual CPE device at the remote location and providing the network attack firewall protections with the virtual CPE device before rerouting the network data from the virtual CPE device to an intended recipient.

9. The computing device of claim 8, further comprising processing circuitry to:
   automatically configure the plurality of other physical CPE devices, based on the updated configuration information, to be compatible with the virtual CPE device.

10. The computing device of claim 8, further comprising processing circuitry to:
    receive a registration request corresponding to a new CPE device, the registration request comprising information for registering the new CPE device with the private network;
    register the new CPE device with the private network based on the information received; and
    initialize the new CPE device in response to registering the new CPE device with the private network.

11. The computing device of claim 10, wherein the registration and initialization of the new CPE device occurs via a wireless network and network traffic within the private network is routed through the one or more computing devices via a wired network.

12. The computing device of claim 10, further comprising processing circuitry to:
    prior to registering the new CPE device with the private network, receive a request to register the CPE device with a wireless network; and
    register the new CPE device with the wireless network in response to receiving the request.

13. The computing device of claim 8, further comprising processing circuitry to:
    receive CPE network traffic from one of the plurality of other CPE devices; and
    route the CPE network traffic to another of the plurality of CPE devices.

14. The computing device of claim 8, wherein the configuration information includes a plurality of machine-readable, computer-programming objects that comprise information describing the private network and information to control the behavior of the private network.

15. One or more computing devices of a data center comprising:
    a non-transitory memory device storing:
       a plurality of processor-executable instructions; and
    a processor configured to execute the processor-executable instructions, wherein executing the processor-executable instructions causes the one or more computing devices to:
       receive a request requesting addition of a network service to a particular customer location, wherein the data center is in a different remote location than the particular customer location with the particular customer location including at least one physical customer premise equipment (CPE) device implementing a private network with a plurality of other physical CPE devices located at a plurality of additional customer locations;
       create on the one or more computing devices of the data center and in response to the request, a virtual CPE device providing the requested network service for the particular customer location from the remote location of the data center;
       update, based on the creation of the virtual CPE device, configuration information of the at least one physical CPE device and the plurality of other physical CPE devices, said update comprising adding the virtual CPE device to the private network by providing routing and addressing of the virtual CPE device to the configuration information;
       automatically configure, based on the updated configuration information, the at least one physical CPE device at the particular customer location and the plurality of other physical CPE devices located at the plurality of additional customer location, said automatically configuring comprising distributing said configuration information with said routing and said addressing of the virtual CPE device from the data center to the at least one physical CPE device at the particular customer location;
       modify operation of the at least one physical CPE device in response to said distributing, wherein said modify comprises routing network data from the at least one physical CPE device at the particular customer location to the virtual CPE device at the data center in the remote location and providing the network service on the network data with the virtual CPE device before rerouting the network data from the virtual CPE device to a CPE device of the plurality of other physical CPE devices specified as an original destination for said network data by the at least one physical CPE device.

16. The one or more computing devices of claim 15, wherein additional virtual CPE devices are created for the plurality of other physical CPE devices, each of the additional virtual CPE devices implementing a network service requested by a network administrator and implementing the functionality corresponding to the requested network service.

17. The one or more computing devices of claim 16, wherein the at least one physical CPE device at the particular customer location and the plurality of other physical CPE devices located at the plurality of additional customer locations are automatically configured based on updated configuration information resulting from the creation of the additional virtual CPE devices.

\* \* \* \* \*